United States Patent
Yanazume

(10) Patent No.: US 7,689,117 B2
(45) Date of Patent: Mar. 30, 2010

(54) MULTI-MODULE PHOTOGRAPHY SYSTEM

(75) Inventor: Tai Yanazume, Kanagawa (JP)

(73) Assignee: Panasonic Corporation, Osaka (JP)

( * ) Notice: Subject to any disclaimer, the term of this patent is extended or adjusted under 35 U.S.C. 154(b) by 571 days.

(21) Appl. No.: 11/643,618

(22) Filed: Dec. 22, 2006

(65) Prior Publication Data
US 2007/0160361 A1    Jul. 12, 2007

(30) Foreign Application Priority Data
Jan. 11, 2006    (JP) .............................. 2006-003876

(51) Int. Cl.
*G03B 41/00*    (2006.01)
(52) U.S. Cl. .................. 396/333; 396/427; 348/143
(58) Field of Classification Search .............. 396/333, 396/427; 348/352, 364, 362, 143
See application file for complete search history.

(56) References Cited

U.S. PATENT DOCUMENTS

| | | | | |
|---|---|---|---|---|
| 5,634,162 | A * | 5/1997 | Suzuki | 396/429 |
| 5,668,595 | A * | 9/1997 | Katayama et al. | 348/218.1 |
| 6,417,886 | B1 * | 7/2002 | Tariki | 348/384.1 |
| 2004/0046966 | A1 * | 3/2004 | Fujita | 356/604 |
| 2006/0082663 | A1 * | 4/2006 | Rooy et al. | 348/231.99 |

FOREIGN PATENT DOCUMENTS

| | | |
|---|---|---|
| JP | 5-265082 | 10/1993 |
| JP | 5-344422 | 12/1993 |
| JP | 6-6680 | 1/1994 |
| JP | 6-38955 | 2/1994 |
| JP | 11-103472 | 4/1999 |
| JP | 2003-264851 | 9/2003 |
| JP | 2004-048644 | 2/2004 |

OTHER PUBLICATIONS

Japanese Office Action, with English Translation, issued in Japanese Patent Application No. JP 2006-003876, dated Jun. 18, 2008.

* cited by examiner

*Primary Examiner*—Warren K. Fenwick
(74) *Attorney, Agent, or Firm*—McDermott Will & Emery LLP

(57) ABSTRACT

A photography system includes: camera modules, which output, for individual pixels, picture data in synchronization with pixel clocks and which are arranged so that the light receiving directions of light receiving devices match; a camera control apparatus, which supplies an operating clock to the camera modules with a phase difference of half a cycle, and which generates a phase difference of half a cycle in picture data output by the camera modules; an output synthesizing apparatus, which synthesizes, in a time division manner, picture data output by the camera modules; and an image processing apparatus, which employs information about a distance between the camera modules for the reconstruction of a single picture, using the picture data synthesized by the output synthesizing apparatus.

7 Claims, 11 Drawing Sheets

MULTI-MODULE PHOTOGRAPHY SYSTEM

BACKGROUND OF THE INVENTION

1. Field of the Invention

The present invention relates to a photography system, such as a digital camera or a cellular phone equipped with a camera, on which a camera module for taking pictures is mounted.

2. Description of the Related Art

A data transfer rate between a camera module and an image processing device is an important technical element in the taking of high resolution static and moving pictures. When an increase in resolution is more developed and a transfer capacity required for the transfer of data for one screen is increased, several problems occur, especially with an apparatus having a low transfer rate. For example, an extended period of time may be required from the taking of one static picture until an apparatus is ready to perform the next photographic process, e.g., continuous photography can not be performed.

Further, an image pickup cycle (a frame rate) may be slow for photographing of moving pictures, and the a picture quality may be inferior.

To resolve these problems, a method whereby the transfer capability is improved by increasing the operating frequency of a camera module is conventionally employed. However, while the resolution of a photographic apparatus may have been increased, an improvement in the transfer rate obtained by increasing the operating frequency may be approaching a limit.

Further, another method for resolving the problems has been proposed whereby two camera modules receive and optically process the same picture, so that the transfer capability is doubled (see, for example, JP-A-6-38955 pp. 2-4, FIG. 1). However, this method is not appropriate for general use because it is complicated when a polarization device is installed, especially in a small apparatus, such as a cellular phone, and it is difficult for the same optical image to be projected by two cameras, and because two image input systems must be prepared for an image processing apparatus and a device, such as a general-purpose image processing LSI, can not be employed, else the manufacturing cost would be increased.

SUMMARY OF THE INVENTION

One objective of the present invention is to provide a photography system that can provide an increased picture transfer rate, without having to increase the operating frequencies of camera modules.

To achieve this objective, according to a first aspect of the invention, a photography system comprises:

first and second camera modules, arranged so as to match light receiving directions for light receiving devices, and to output, for individual pixels, picture data obtained in synchronization with pixel clocks;

a camera control apparatus, for supplying an operating clock to the first and the second camera modules, with a phase difference of up to half a cycle, and for generating a phase difference of half a cycle between picture data output by the first and the second camera modules;

an output synthesizing apparatus, for synthesizing, in a time division manner, picture data output by the first and the second camera modules; and an image processing apparatus, for, based on information concerning a distance between the first and the second camera modules, employing the picture data obtained by the first and second camera modules, and synthesized by the output synthesizing apparatus, to reconstruct a single target picture. According to this configuration, pictures output by the two camera modules are synthesized in a time division manner, and are alternately transmitted to the image processing apparatus, and based on the distance information for the two camera modules, the two pictures are superimposed to reconstruct a single picture. Therefore, the rate at which data is transferred to the image processing apparatus can be increased, without the operating frequencies of the camera modules being raised.

Further, according to a second aspect of the invention, the photography system of the first aspect further comprises:

a camera drive control apparatus, for, in accordance with a control instruction received from the image processing apparatus, driving at least one of the first and the second camera modules and controlling the distance between the first and the second camera modules, and for supplying, to the image processing apparatus, an updated camera distance as a camera distance information, wherein, based on the camera distance information supplied by the camera driving apparatus, the image processing apparatus reconstructs one target picture by employing the picture data obtained by the first and the second camera modules and synthesized with the output synthesized by the output synthesizing apparatus. According to this configuration, the pictures output by the two camera modules are synthesized, in a time division manner, so that they alternately enter the image processing apparatus, and so that one picture is reconstructed by appropriately combining these two pictures, based on the information received concerning the variable distance between the camera modules. Therefore, the rate at which data is transferred to the image processing apparatus can be increased, without the operating frequencies of the camera modules being raised.

According to a third aspect of the invention, the photography system of the first aspect further comprises:

a camera angle control apparatus, for, in accordance with a control instruction received from the image processing apparatus, driving at least one of the first and the second camera modules and controlling the directions in which light is received by the light receiving devices of the first and the second camera modules, and for supplying, to the image processing apparatus, an angle difference between the updated light directions received as camera angle information, wherein, based on the camera angle information received from the camera angle control apparatus, the image processing apparatus reconstructs one picture by employing the picture data obtained by the first and second camera modules and synthesized by the output synthesizing apparatus. According to this arrangement, the pictures output by the two camera modules are synthesized in a time division manner so that they alternately enter the image processing apparatus, and so that one picture is reconstructed by appropriately combining these two pictures, based on information for a variable angle difference between the camera modules. Therefore, the rate at which data is transferred to the image processing apparatus can be increased, without the operating frequencies of the camera modules being raised.

According to a fourth aspect of the invention, for the photography system of one of the first to the third aspects, the output synthesizing apparatus includes:

a circuit for permitting a selector, which employs as a selection signal a pixel clock that is output by either the first or second camera module, to synthesize, in a time division manner, picture data that are output by the first and the second camera modules, at a phase difference of half a cycle, and for outputting the resultant picture data through one camera output terminal. According to the arrangement, since the pictures output by the two camera modules are synthesized in a time division manner, so that they alternately enter the image processing apparatus, one picture can be reconstructed based on these two pictures. Therefore, the rate at which data is transferred to the image processing apparatus can be increased, without the operating frequencies of the camera modules being raised.

According to a fifth aspect of the invention, a photography system comprises:

N camera modules, or at least three, arranged so as to match light receiving directions for light receiving devices and for outputting, to individual pixels, obtained picture data in synchronization with pixel clocks;

a camera control apparatus, for supplying an operating clock for the N camera modules with each phase difference in a 1/N cycle and for generating a phase difference, for a 1/N cycle, included in picture data output by the N camera modules;

an output synthesizing apparatus, for synthesizing, in a time division manner, picture data output by the N camera modules; and an image processing apparatus, for, based on information concerning distances among the N camera modules, employing the picture data obtained by the N camera modules, and synthesized by the output synthesizing apparatus, to reconstruct a single target picture. According to this configuration, pictures output by a plurality of camera modules are synthesized in a time division manner, and are alternately transmitted to the image processing apparatus, and based on the distance information received for the camera modules, the multiple pictures are superimposed to reconstruct one picture. Therefore, the rate at which data is transmitted to the image processing apparatus can be increased, without the operating frequencies of the camera modules being raised.

According to a sixth aspect of the invention, for the photography system of the fifth aspect, the output synthesizing apparatus includes:

a circuit for synthesizing, in a time division manner, picture data output by the N camera modules by employing a selector that uses, as a selection signal, the output of a counter that regards as a counter clock a clock obtained by multiplying by N pixel clocks that are output by the N camera modules, and for outputting the resultant picture data through one camera output terminal. According to the arrangement, since the picture data obtained by a plurality of camera modules are synthesized in a time division manner, so as to alternately enter the image processing apparatus, one picture can be reconstructed based on these picture data. Therefore, the rate at which data are transferred to the image processing apparatus can be increased, without the operating frequencies of the camera modules being raised.

According to a seventh aspect of the invention, a photography system comprises:

a camera module, including first and second optical input units, for synthesizing, in a time division manner, picture data respectively obtained by the first and second optical input units, and for outputting the picture data to individual pixels, in synchronization with pixel clocks; and an image processing apparatus, for re-synthesizing the two sets of picture data, which have been supplied to the respective optical input units to be synthesized in a time division manner. According to this arrangement, the outputs of the two optical input units are alternately synthesized in a time division manner, and based on the distance information received for the optical input units, the two pictures are appropriately superimposed to reconstruct one picture. Thus, the rate at which data is transferred to the image processing apparatus can be increased, without the operating frequency of the camera module being raised.

According to an eighth aspect of the invention, for the photography system of the seventh aspect, the camera module includes:

first and second optical device groups, to be operated independently in consonance with the first and second optical input units, wherein an operating clock having a phase difference of half a cycle is supplied to the first and the second optical device groups to obtain a phase difference of half a cycle between the picture data output by the first and the second optical device groups, wherein picture data output by the first and second optical device groups are synthesized in a time division manner for output as the output of a single camera.

According to the invention, without increasing the operating frequency of the camera module, the rate at which picture data is transmitted between the camera device and the image processing apparatus of the photography system can be increased.

DESCRIPTION OF THE PREFERRED EMBODIMENTS

Figure 1:
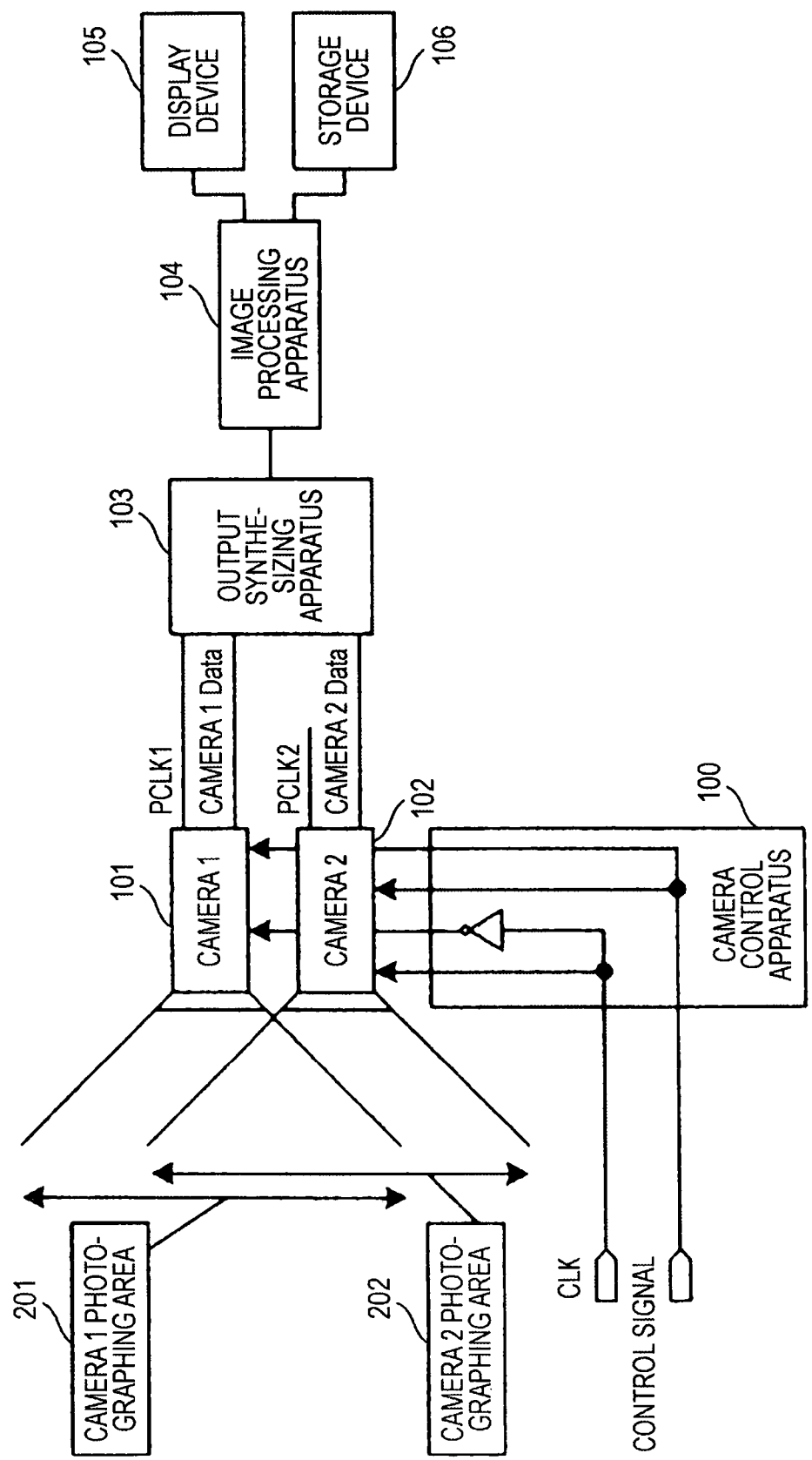
FIG. 1 is a diagram showing the configuration of a photography system according to a first embodiment of the present invention.

FIG. 1 is a diagram showing the configuration of a photography system according to a first embodiment of the present invention. The photography system mainly comprises: a camera control apparatus 100, camera modules 101 and 102, an output synthesizing apparatus 103, an image processing apparatus 104, a display device 105 and a storage device 106.

The camera control apparatus 100 controls the operation of a camera by shifting the phase of a clock to be supplied to the camera modules. The camera modules 101 and 102 are well known camera modules that output picture data to individual pixels in synchronization with pixel clocks. In this embodiment, the camera modules 101 and 102 are arranged so that the light receiving directions of the light receiving devices match.

Figure 2:
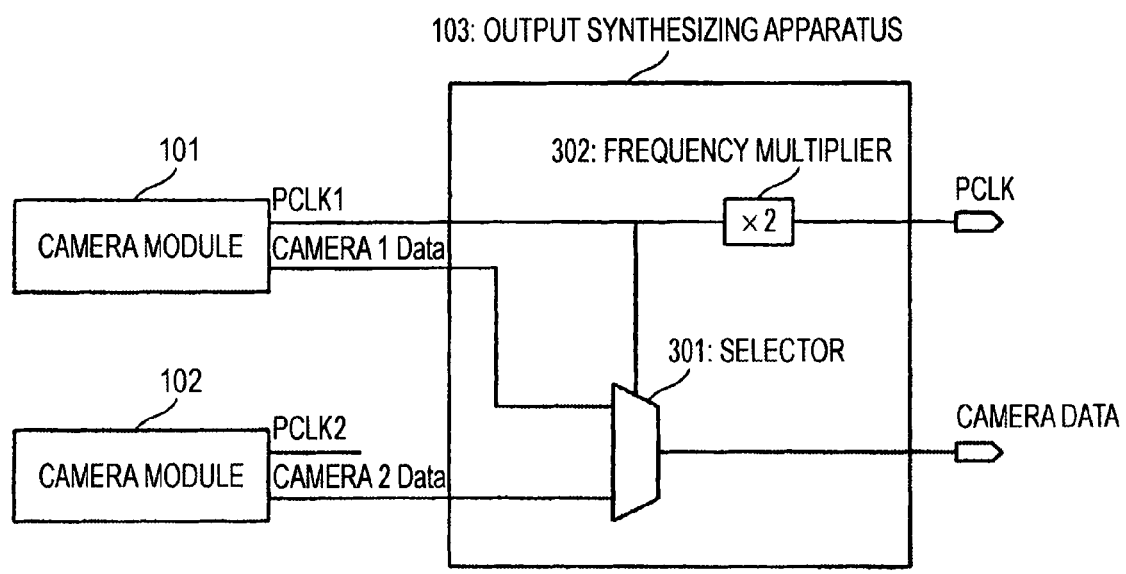
FIG. 2 is a diagram showing the internal arrangement of the synthesizing output apparatus of the photography system according to the first embodiment.

The output synthesizing apparatus 103 synthesizes, in a time division manner, picture data output by the camera modules 101 and 102, to obtain a single set of picture data, and outputs the picture data to the image processing apparatus 104. FIG. 2 is a diagram showing the internal arrangement of the output synthesizing apparatus 103 of the photography system for the first embodiment. The output synthesizing apparatus 103 includes a selector 301 and a frequency multiplier 302. The selector 301 receives picture data from two picture output units, and also receives, as a selection signal, a pixel clock from one of the picture output units. The two sets of picture data that are received are sequentially output in accordance with H/L of the pixel clock, and as a result, synthesization of the picture data is performed in a time division manner.

The frequency multiplier 302 is a unit for doubling the frequency of a pixel clock in order to adjust the pixel clock to picture data obtained through the time-division synthesization.

The image processing apparatus 104 reconstructs a picture based on the picture data obtained through time division synthesization and transmitted by the output synthesizing apparatus 103, and outputs this picture to the display device 105 or the storage device 106. The display device 105 is a well known display device, such as an LCD, and the storage device 106 is a well known data recording device.

The camera control apparatus 100 adjusts an operating clock (CLK), which is externally supplied for the operations performed by the camera modules 101 and 102, so that between them there is a phase difference of half a cycle. Thus, the timings at which camera modules 101 and 102 output picture data are shifted half a cycle. On the other hand, however, the same timing is used for the transmission to the camera modules 101 and 102, via the camera control apparatus 100, of control signals for a photographing start and a photographing stop, and for the setting of an output picture area.

The operation of the photography system having this configuration will now be described. First, the overview of the operation of the photography system will be explained. For the photography system of this invention, the outputs of two adjacent camera modules, for which the light receiving directions are the same, are shifted half a cycle, and a selector synthesizes the outputs of the two camera modules in a time division manner, so that these outputs alternately enter the image processing apparatus. As a result, the rate at which picture data is transferred to the image processing apparatus can be doubled, without the operating frequencies of the camera modules being increased. On the other hand, however, when pictures obtained by the two adjacent camera modules, for which the light receiving directions are the same, are simply superimposed, the pictures are shifted a distance equivalent to that between the light receiving devices. Therefore, according to the photography system of this invention, the image processing apparatus obtains distance information for the camera modules, and based on this information, superimposes two pictures to reconstruct a single one.

First, the camera control apparatus 100 shifts the clock phase for one camera module half a cycle. Then The camera modules 101 and 102 output pixel clocks in synchronization with the operating clock received from the camera control apparatus 100. Therefore, the phase of the pixel clock output by the camera module 101 is shifted half a cycle from the phase of the pixel clock output by the camera module 102. That is, the timing for the output of picture data is shifted half a cycle.

Sequentially, the output synthesizing apparatus 103, which receives the pixel clocks and picture data from the camera modules 101 and 102, performs time division synthesization, i.e., permits the selector 301 to alternately output the picture data received from the camera modules 101 and 102, while employing a pixel clock as a selection signal. At this time, the output synthesizing apparatus 103 doubles the pixel clock and transmits this clock to the image processing apparatus 104, so that the image processing apparatus 104 can obtain the synthesized data.

Figure 3:
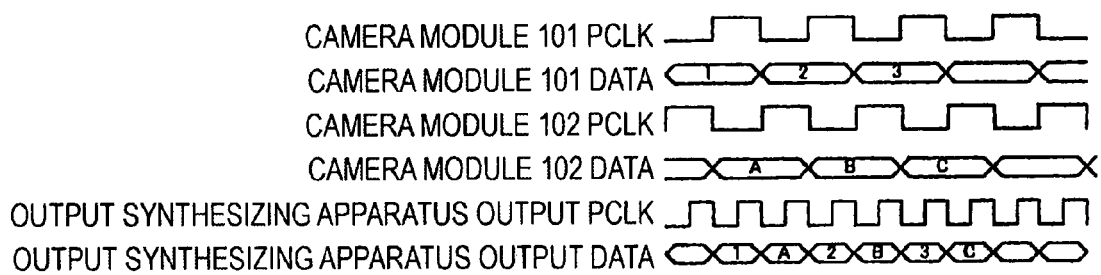
FIG. 3 is a timing chart for a time division synthesization operation for the photography system according to the first embodiment.

FIG. 3 is a timing chart for the time division synthesization operation performed by the photography system of the first embodiment. "Camera module 101 PCLK" indicates a pixel clock output by the camera module 101, "Camera module 101 DATA" indicates picture data output by the camera module 101, "Camera module 102 PCLK" indicates a pixel clock output by the camera module 102, and "Camera module 102 DATA" indicates picture data output by the camera module 102. Furthermore, "Output synthesizing apparatus output PCLK" indicates a pixel clock after time division synthesization, and "Output synthesization apparatus output DATA" indicates picture data after time division synthesization.

Figure 4:
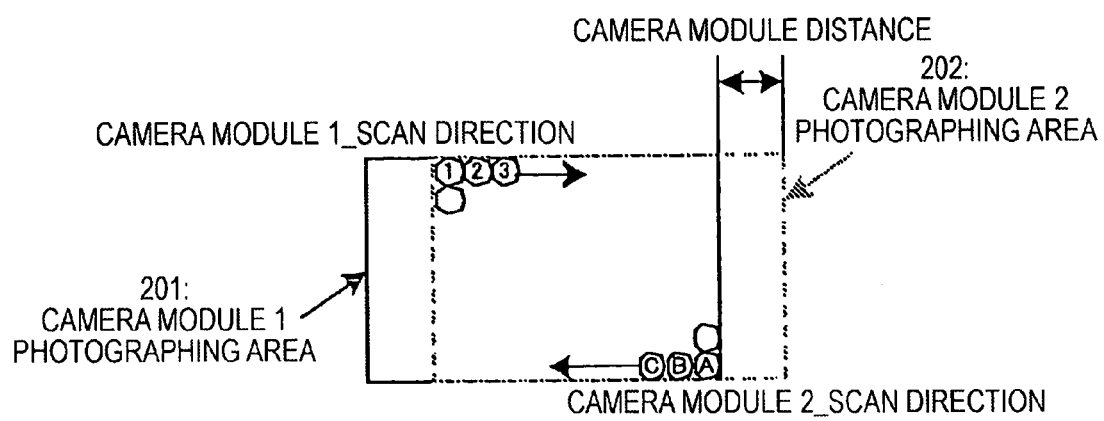
FIG. 4 is a diagram for explaining the processing for reconstructing one picture based on picture data obtained through time division synthesization.

The image processing apparatus 104 reconstructs one picture based on picture data produced by time division synthesization, and distance information for the camera modules. FIG. 4 is a diagram for explaining the processing performed to reconstruct one picture based on picture data produced by time division synthesization. As shown in FIG. 4, to reconstruct one picture, picture data are sequentially arranged in the pixel scan directions of the camera modules. At this time, in response to a control signal, the pixel scan directions of the camera modules are set in advance, in order to scan a predetermined area in designated directions. The picture reconstructed by the image processing apparatus 104 is displayed on the display device 105, or is stored in the storage device 106.

Figure 5:
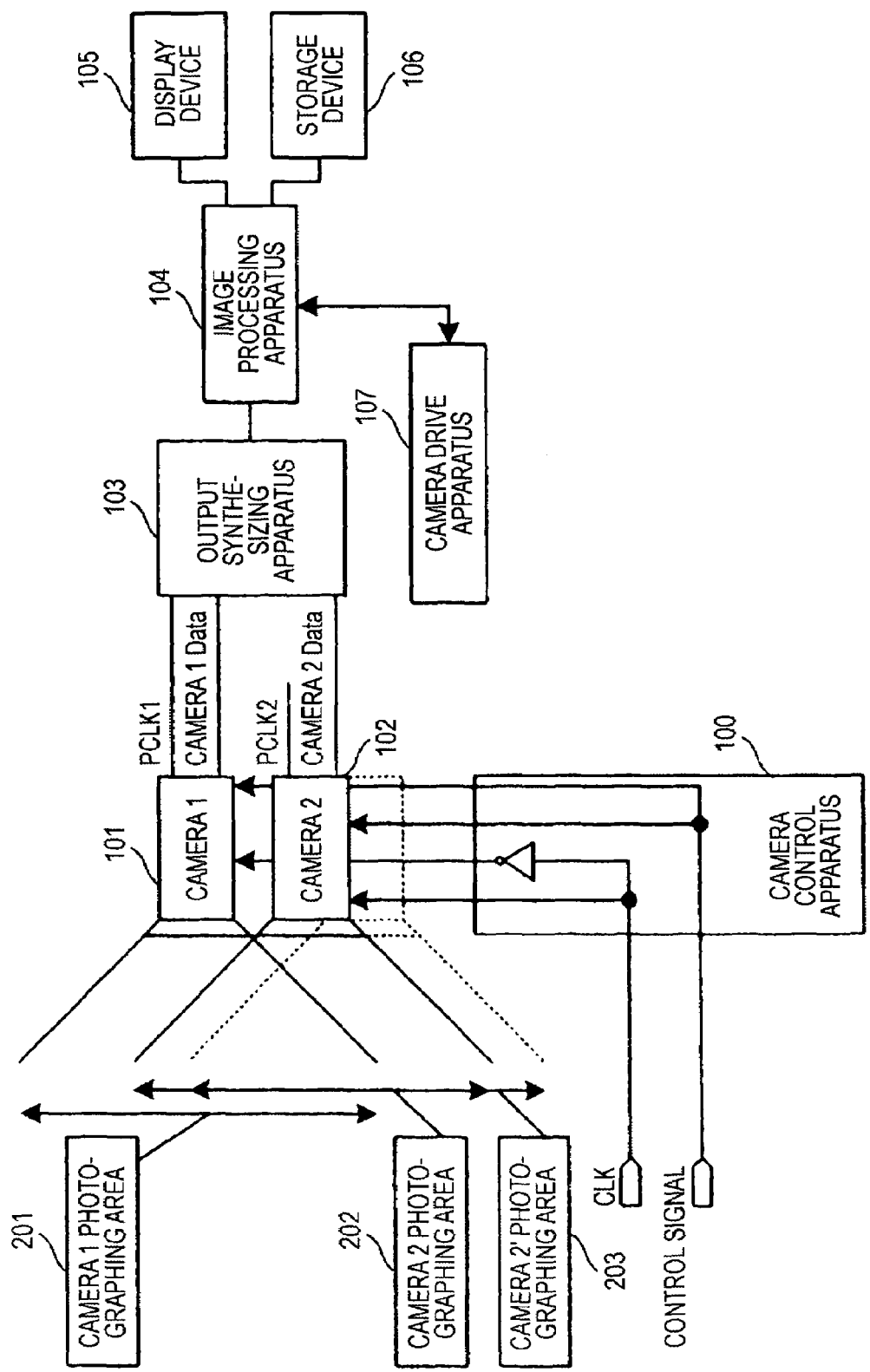
FIG. 5 is a diagram showing the configuration of a photography system according to a second embodiment of the present invention.

FIG. 5 is a diagram showing the configuration of a photography system according to a second embodiment of the present invention. The second embodiment differs from the first embodiment in that a camera drive apparatus 107 is additionally provided. The camera drive apparatus 107 controls the distance between camera modules 101 and 102 in accordance with an instruction issued by an image processing apparatus 104. Specifically, a drive mechanism (not shown), which moves the camera module 102 parallel, so as not to change the light receiving direction of its light receiving device, is employed to change the distance between the camera modules 101 and 102.

Further, the camera drive apparatus 107 transmits, as a feedback, camera module distance information to the image processing apparatus 104. In this embodiment, a drive mechanism is provided only for the camera module 102; however, a drive mechanism may be provided for the camera module 101, or for both the camera modules 101 and 102.

The operation of the photography system having this configuration will now be described. First, a camera control apparatus 100 shifts a clock phase for one camera module half a cycle, and the camera modules 101 and 102 output pixel clocks in synchronization with an operating clock received from the camera control apparatus 100. Therefore, the phase of the pixel clock output by the camera module 101 is shifted, from the phase of the pixel clock output by the camera module 102, half a cycle. That is, picture data output timings are shifted half a cycle.

Sequentially, an output synthesizing apparatus 103, which receives pixel clocks and picture data from the camera modules 101 and 102, performs time division synthesization for picture data received from the camera modules 101 and 102, i.e., permits a selector to alternately output the picture data by employing a pixel clock as a selection signal. At this time, the output synthesization apparatus 103 doubles the speed of the pixel clock, and transmits the double-speed pixel clock to the image processing apparatus 104, so that the image processing apparatus 104 can obtain synthesized data.

The timing for the reception of pixel clocks and picture data from the camera modules 101 and 102 and the timing for the output of a double-speed pixel clock and synthesized picture data to the image processing apparatus 104 are the same as those shown in FIG. 3 for the first embodiment.

Following this, the image processing apparatus 104 reconstructs one picture, based on the picture data that are obtained through time division synthesization, and the distance information for the camera modules 101 and 102, which is returned from the camera drive apparatus 107. Since this processing is the same as the method shown in FIG. 4 for the first embodiment, no detailed explanation for it will be given. The picture reconstructed by the image processing apparatus 104 is displayed on a display device 105, or is stored in a storage device 106.

Figure 6:
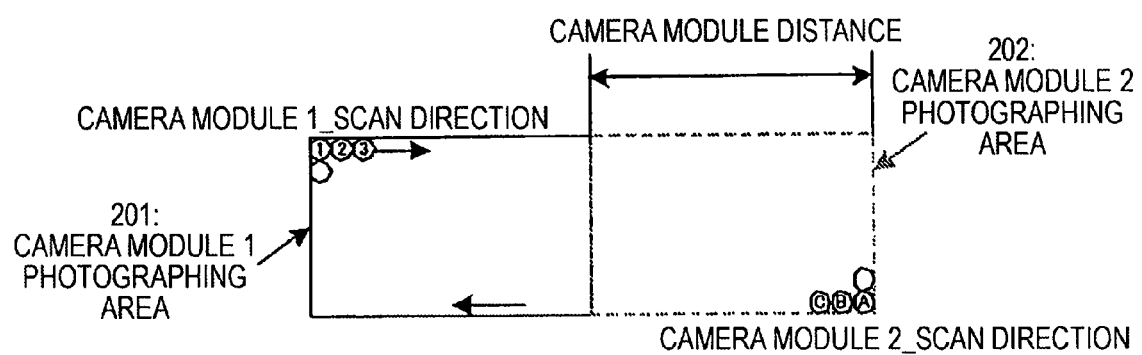
FIG. 6 is a diagram for explaining the processing for reconstructing one picture based on picture data obtained through time division synthesization in a case wherein the distance between camera modules is extended so as not to overlap photographing areas.

According to the photography system of the second embodiment, since the distance between the camera modules 101 and 102 can be freely changed, the portion wherein the photographed areas for the camera modules 101 and 102 can be scanned at the same time, and the picture data transfer rate can be increased (see FIG. 4). Moreover, when the distance between the camera modules 101 and 102 is adjusted so as not to overlap the photographed areas for these modules 101 and 102, the system in this embodiment can also be employed to increase the resolution of a picture to be photographed. FIG. 6 is a diagram for explaining the processing for reconstructing a picture based on picture data obtained through time division synthesization in a case wherein the distance between camera modules is extended so as not to overlap their photographed areas. Specifically, when the resolution of one camera module is 240×320, a picture can be obtained at a maximum resolution of 480×320.

Figure 7:
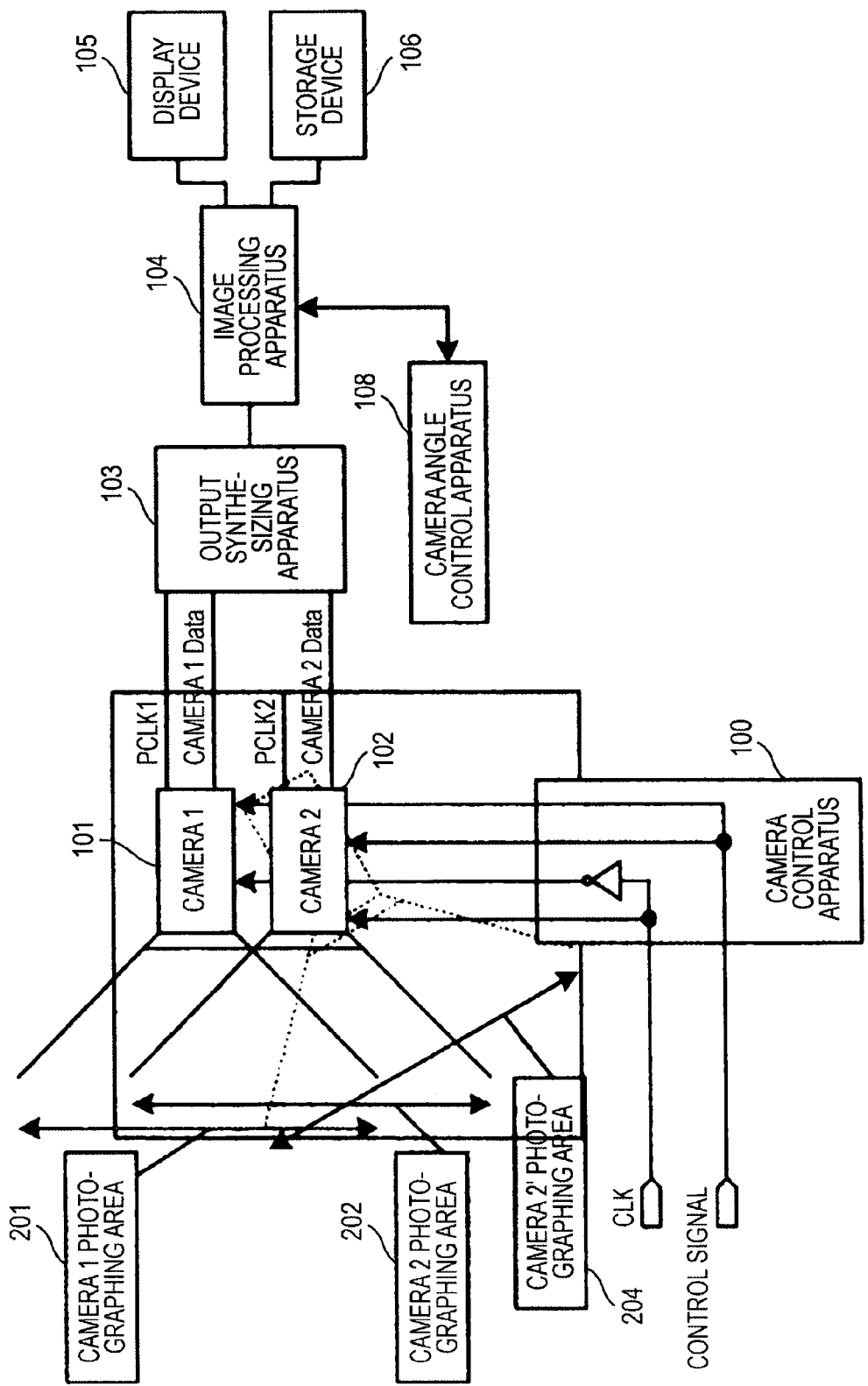
FIG. 7 is a diagram showing the configuration of a photography system according to a third embodiment of the present invention.

FIG. 7 is a diagram showing the configuration of a photography system according to a third embodiment of the present invention. The third embodiment differs from the first embodiment in that a camera angle control apparatus 108 is additionally provided. In accordance with an instruction issued by an image processing apparatus 104, the camera angle control apparatus 108 controls the photographing directions of camera modules 101 and 102, i.e., light receiving directions for light receiving devices. Specifically, a drive mechanism (not shown), which freely changes the light receiving direction for the light receiving device of the camera module 102, is employed to change a difference in an angle between the camera modules 101 and 102. Additionally, the camera angle control apparatus 108 transmits as feedback, camera module angle difference information to the image processing apparatus 104. In this embodiment, the drive mechanism is provided only for the camera module 102; however, the drive mechanism may be provided for the camera module 101, or for both camera modules 101 and 102.

The operation of the photography system having this configuration will now be described. First, a camera control apparatus 100 shifts a clock phase for one camera module half a cycle, and the camera modules 101 and 102 output pixel clocks in synchronization with an operating clock received from the camera control apparatus 100. Therefore, the phase of the pixel clock output by the camera module 101 is shifted half a cycle from the phase of the pixel clock output by the camera module 102. That is, picture data output timings are shifted half a cycle.

Sequentially, an output synthesizing apparatus 103, which receives pixel clocks and picture data from the camera modules 101 and 102, performs time division synthesization for picture data received from the camera modules 101 and 102, i.e., permits a selector to alternately output picture data by employing a pixel clock as a selection signal. At this time, the output synthesization apparatus 103 doubles the speed of the pixel clock, and transmits the double-speed pixel clock to the image processing apparatus 104, enabling the image processing apparatus 104 to obtain synthesized data.

The timing for the reception of pixel clocks and picture data from the camera modules 101 and 102 and the timing for the output of double-speed pixel clock and synthesized picture data to the image processing apparatus 104 are the same as those shown in FIG. 3 for the first embodiment.

Following this, the image processing apparatus 104 reconstructs a single picture based on the received picture data, which are obtained through time division synthesization, and the angle difference information for the camera modules 101 and 102, which is supplied by the camera angle control apparatus 107. Since this processing is the same as the method shown in FIG. 4 for the first embodiment, no detailed explanation for it will be given, except to state that the picture reconstructed by the image processing apparatus 104 is either displayed on a display device 105 or is stored in a storage device 106.

Figure 8:
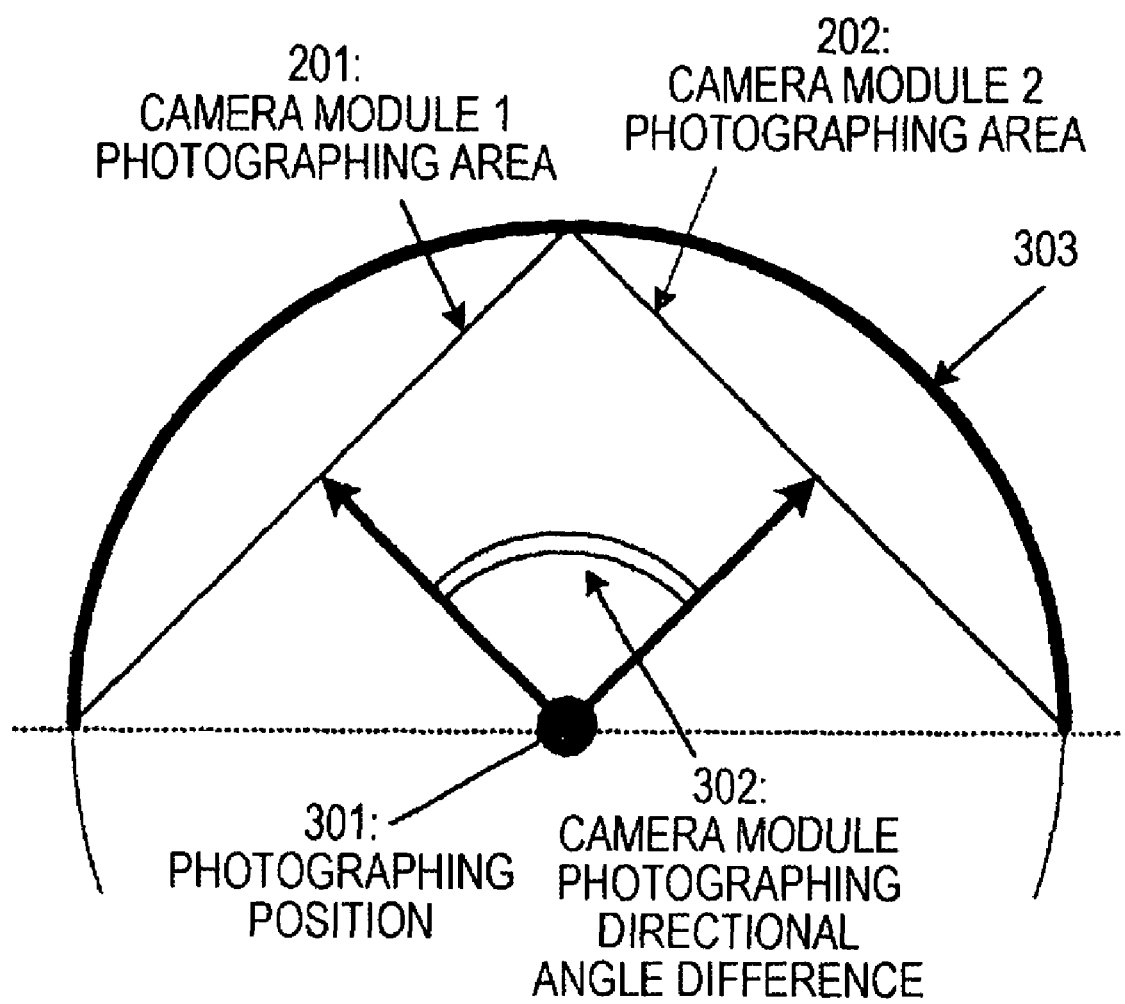
FIG. 8 is a diagram for explaining a range to be photographed in a case wherein an angle difference between camera modules is extended so as not to overlap photographing areas.

According to the photography system of the third embodiment, since the angle difference (photographing direction) between the camera modules 101 and 102 can be freely changed, the portion wherein the photographing areas for both the camera modules 101 and 102 can be simultaneously scanned, and the picture data transfer rate can be increased (see FIG. 4). Moreover, when the angles for the camera modules 101 and 102 are adjusted so as not to overlap the photographing areas of these modules 101 and 102, the system in this embodiment can also be employed for photography performed in a 180° panorama mode. FIG. 8 is a diagram for explaining the range to be photographed in a case wherein the angle difference between camera modules is extended, so that the areas they photograph do not overlap.

Figure 9:
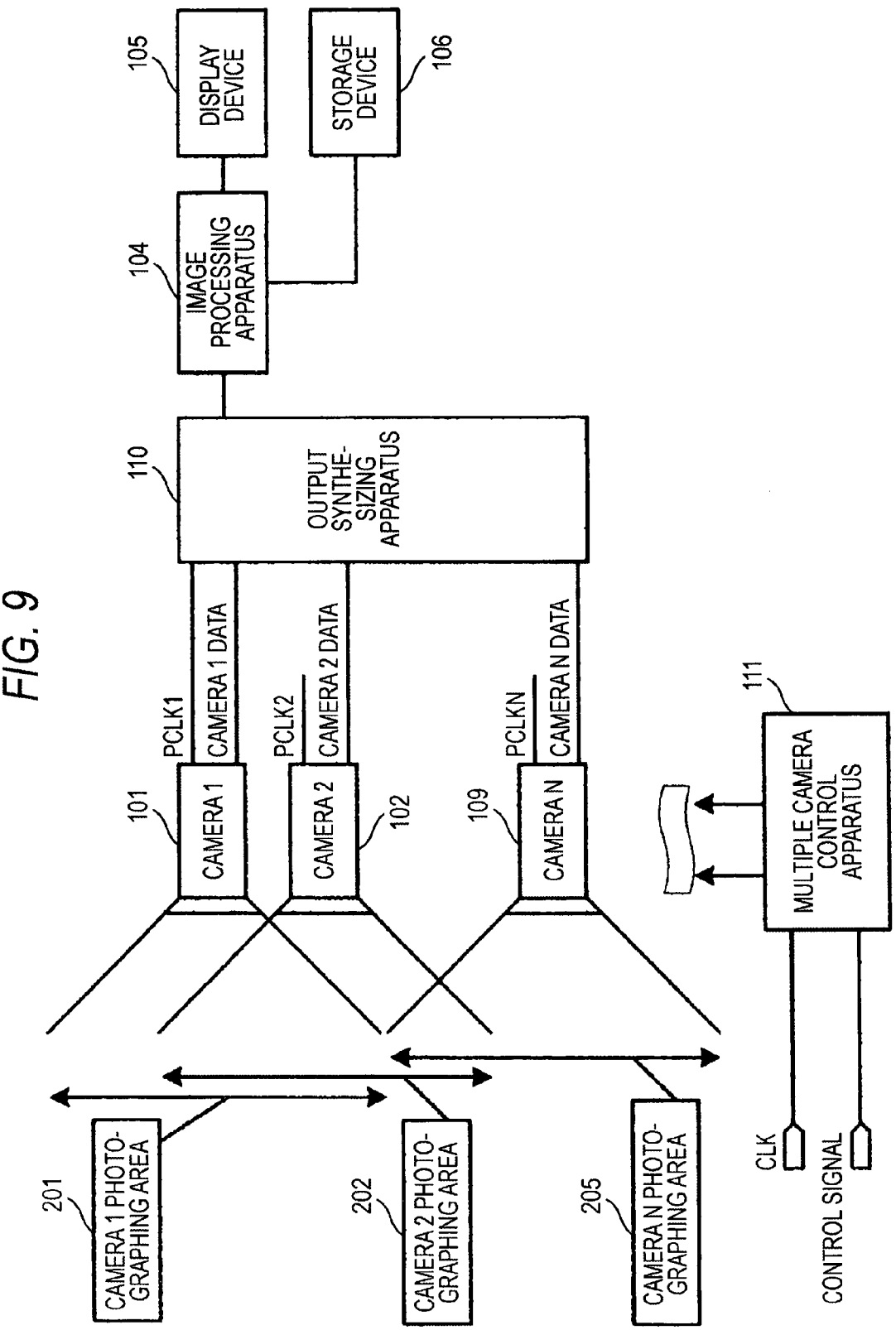
FIG. 9 is a diagram showing the configuration of a photography system according to a fourth embodiment of the present invention.

FIG. 9 is a diagram showing the configuration of a photography system according to a fourth embodiment of the present invention. This photography system mainly comprises: a plurality (N) of camera modules 101, 102 to 109, an image processing apparatus 104, a display device 105, a storage device 106, an output synthesizing apparatus 110 and multiple camera control apparatuses 111.

The multiple camera control apparatuses 111 control camera operation by shifting the phase of a clock that is supplied to a camera module. The N camera modules 101 to 109 are well known camera modules that output, for individual pixels, picture data synchronized with pixel clocks. In this embodiment, the N camera modules 101 to 109 are so arranged that the light receiving directions of light receiving devices match.

Figure 10:
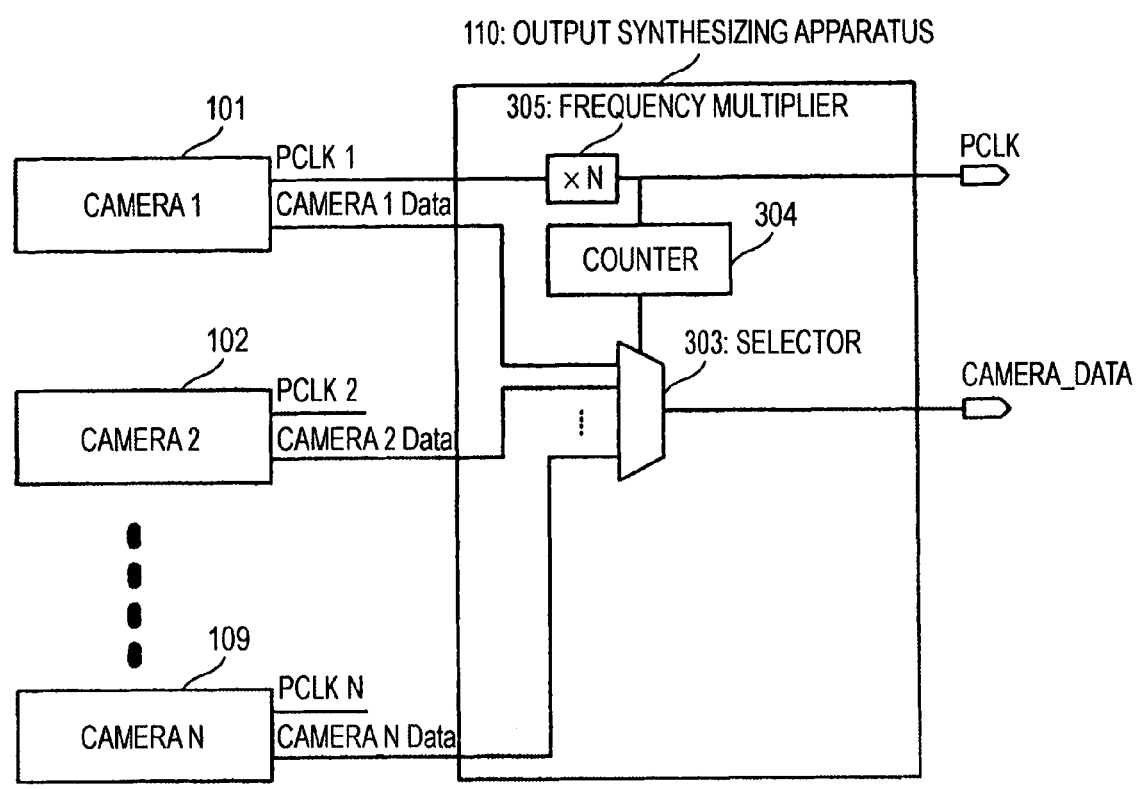
FIG. 10 is a diagram showing the internal arrangement of the output synthesizing apparatus of the photography system according to the fourth embodiment.

The output synthesizing apparatus 110 synthesizes, in a time division manner, picture data output by the N camera modules 101 to 109, and outputs a single set of synthesized picture data to the image processing apparatus 104. And provided in FIG. 10 is a diagram showing the internal arrangement of the output synthesizing apparatus 110 of the photography system of the fourth embodiment. The output synthesizing apparatus 110 includes a selector 303, a counter 304 and a frequency multiplier 305. And while the selector 303 receives picture data from multiple picture input units, it also receives, as a selection signal, a signal output by the counter 304. The counter 304 is an N scale counter when the number of picture input units is N. And the frequency multiplier 305 multiplies, by N, the frequency of a pixel clock received from the picture input unit and transmits the thus obtained clock to the counter 304. N sets of picture data received by the selector 303 are sequentially output at 1/N intervals, provided by the counter 304, and are synthesized in a time division manner.

The image processing apparatus 104 reconstructs a picture based on the synthesized picture data that is output by the output synthesizing apparatus 110, and outputs the reconstructed picture to the display device 105, or to the storage device 106. The display device 105 is a well known display device, such as an LCD, and the storage device 106 is a well known data recording device.

According to the photographing system of this embodiment, the multiple camera control apparatus 111 adjusts an operating clock (CLK), which is externally supplied for operating the N camera modules 101 to 109, so that among the N camera modules a phase difference is a 1/N cycle. Thus, the timings for the output of picture data (the pixel clocks) provided by the camera modules are each shifted 1/N cycle. On the other hand, however, control signals for a photographing start and a photographing end, and for the setting of an output picture area are transmitted at the same timing, via the multiple camera control apparatuses 111, to the camera modules 101 to 109.

The operation of the photography system having this configuration will now be described. First, the multiple camera control apparatus 111 shifts the clock phase 1/N a cycle for each of the camera modules 101 to 109, and the camera modules 101 to 109 output pixel clocks synchronized with the operating clock received from the multiple camera control apparatus 111.

Therefore, there is a 1/N shift in the phases of the pixel clocks output by the camera modules 101 to 109. That is, there is 1/N shift in the picture data output timings.

Sequentially, an output synthesizing apparatus 103, which receives pixel clocks and picture data from the camera modules 101 to 109, performs a time division of synthesization picture data received from the camera modules 101 to 109, i.e., permits the selector 303 to sequentially output the picture data while employing, as a selection signal, the output of the N scale counter 304 that is operated in accordance with a pixel clock.

At this time, the output synthesization apparatus 103 multiples by N the speed of the pixel clock, and transmits the thus obtained pixel clock to the image processing apparatus 104.

Following this, the image processing apparatus 104 reconstructs a single picture, based on the received picture data that are obtained through time division synthesization and predesignated information for the arrangement of the N camera modules 101 to 109. Since this processing is the same as the method shown in FIG. 4 for the first embodiment, no detailed explanation for it will be given. Thereafter, the picture reconstructed by the image processing apparatus 104 is displayed on a display device 105, or is stored in a storage device 106.

Figure 11:
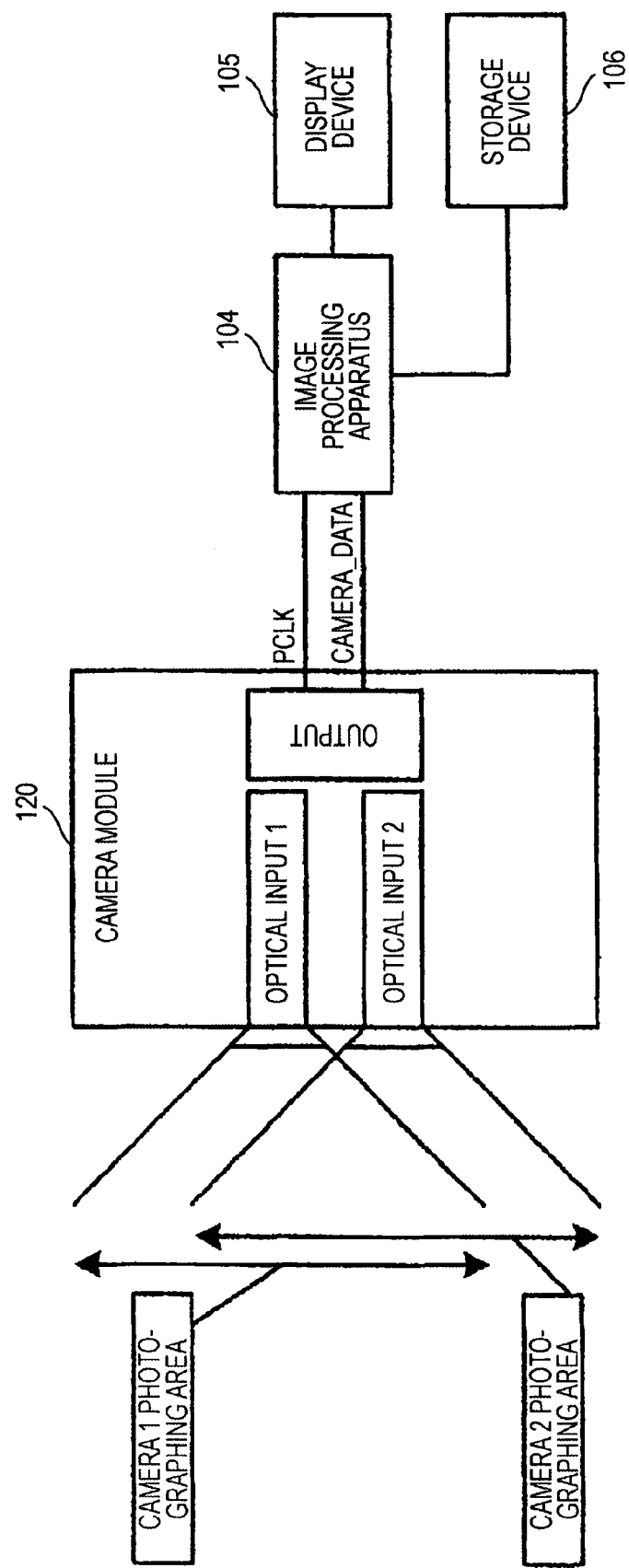
FIG. 11 is a diagram showing the configuration of a photography system according to a fifth embodiment of the present invention.

FIG. 11 is a diagram showing the configuration of a photography system according to a fifth embodiment of the present invention. This photography system mainly comprises a camera module, an image processing apparatus 104, a display device 105 and a storage device 106. The camera module 120 includes: two optical input units facing in the same direction; and light receiving device groups. The camera module 120 performs time division synthesization for picture data obtained by the light receiving device groups, and outputs the obtained picture data through one image output unit.

Figure 12:
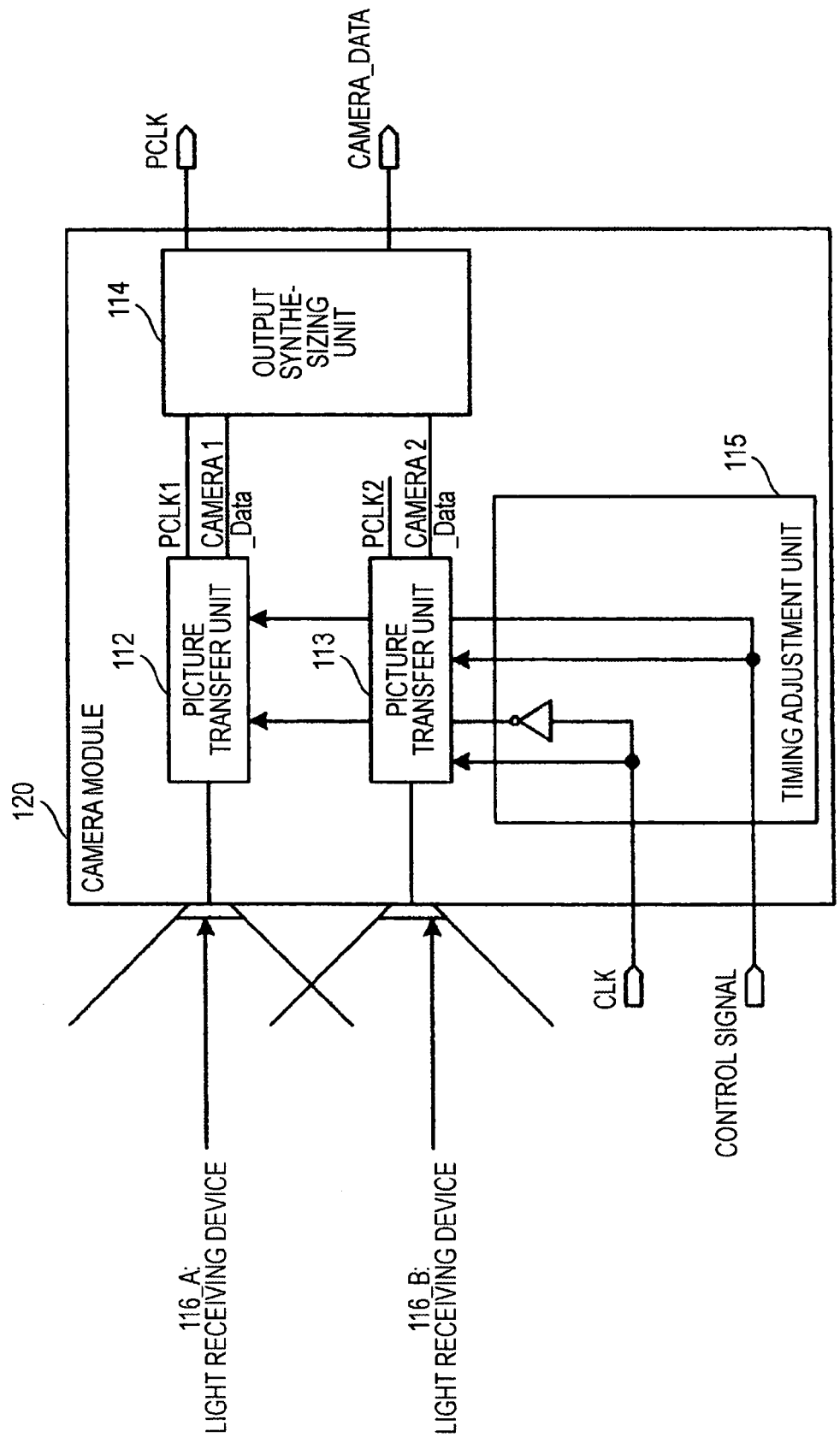
FIG. 12 is a diagram showing the internal arrangement of the camera module of the photography system according to the fifth embodiment.

FIG. 12 is a diagram showing the internal arrangement of the camera module 120 of the photography system according to the fifth embodiment. The camera module 120 includes two light receiving devices 116A and 116B that serve as optical input units, picture transfer units 112 and 113, an output synthesizing unit 114 and a timing adjustment unit 115. The light receiving devices 116A and 116B are arranged so that their light receiving directions are matched, and output, to the picture transfer units 112 and 113, data for individual light receiving devices (for individual pixels). In accordance with an instruction predesignated by a control signal, the picture transfer units 112 and 113 output to the output synthesizing unit 114, in synchronization with pixel clocks, the picture data received from the light receiving devices 116A and 116B.

The contents designated by the control signal are, for example, an instruction for the area to which to transfer picture data, and an instruction related to the order in which picture data is to be transferred. Further, the timing adjustment unit 115 adjusts the timings for clocks to be transmitted to the picture transfer units 112 and 113. Since the clocks to be supplied to the picture transfer units 112 and 113 are shifted half a cycle by the timing adjustment unit 115, the timings for the output of pixel clocks and picture data by the picture transfer units 112 and 113 are each shifted half a cycle. The output synthesizing unit 114 performs time division synthesization for the picture data and the pixel clocks that are received from the picture transfer units 112 and 113 and that have been shifted half a cycle, and externally outputs the resultant picture data pixel clock.

The image processing apparatus 104 reconstructs a single picture based on the picture data, obtained by the camera module 120 and processed by the performance of time division synthesization, and the predesignated distance between the optical input units of the camera module 120.

The operation of the photography system having this configuration will now be explained. First, the camera module 120 performs time division synthesization for two pictures obtained by the light receiving devices 116A and 116B, and outputs the synthesized picture data to the image processing apparatus 104 via a single picture output unit. Thereafter, the image processing apparatus 104 reconstructs a single picture based on the picture data output by the two optical input units. Since this processing is the same as the method shown in FIG. 4 for the first embodiment, no detailed explanation for it will be given. Thereafter, the picture reconstructed by the image processing apparatus 104 is displayed on the display device 105, or is stored in the storage device 106.

The photography system of the present invention provides as one effect an increase in the picture transfer rate, for which the operating frequency of a camera does not need to be raised, and can be usefully employed for an apparatus, such as a digital camera or a cellular phone equipped with a camera, on which a camera module is mounted.

What is claimed is:

1. A photography system, comprising:
   first and second camera modules, arranged so as to match light receiving directions for light receiving devices, and to output, for individual pixels, picture data obtained in synchronization with pixel clocks;
   a camera control apparatus, for supplying an operating clock to the first and the second camera modules, with a phase difference of up to half a cycle, and for generating a phase difference of half a cycle between picture data output by the first and the second camera modules;
   an output synthesizing apparatus, for synthesizing, in a time division manner, picture data output by the first and the second camera modules; and
   an image processing apparatus, for, based on information concerning a distance between the first and the second camera modules, employing the picture data obtained by the first and second camera modules, and synthesized by the output synthesizing apparatus, to reconstruct a single target picture.

2. The photography system according to claim 1, further comprising:
   a camera drive control apparatus, for, in accordance with a control instruction received from the image processing apparatus, driving at least one of the first and the second camera modules and controlling the distance between the first and the second camera modules, and for supplying, to the image processing apparatus, an updated camera distance as a camera distance information,
   wherein, based on the camera distance information supplied by the camera driving apparatus, the image processing apparatus reconstructs one target picture by employing the picture data obtained by the first and the second camera modules and synthesized with the output synthesized by the output synthesizing apparatus.

3. The photography system according to claim 1, further comprising:
   a camera angle control apparatus, for, in accordance with a control instruction received from the image processing apparatus, driving at least one of the first and the second camera modules and controlling the directions in which light is received by the light receiving devices of the first and the second camera modules, and for supplying, to the image processing apparatus, an angle difference between the updated light directions received as camera angle information,
   wherein, based on the camera angle information received from the camera angle control apparatus, the image processing apparatus reconstructs one picture by employing the picture data obtained by the first and second camera modules and synthesized by the output synthesizing apparatus.

4. The photography system according to claim 1, wherein the output synthesizing apparatus includes:
   a circuit for permitting a selector, which employs as a selection signal a pixel clock that is output by either the first or second camera module, to synthesize, in a time division manner, picture data that are output by the first and the second camera modules, at a phase difference of half a cycle, and for outputting the resultant picture data through one camera output terminal.

5. A photography system comprising:
   N camera modules, or at least three, arranged so as to match light receiving directions for light receiving devices and for outputting, to individual pixels, obtained picture data in synchronization with pixel clocks;
   a camera control apparatus, for supplying an operating clock for the N camera modules with each phase difference in a 1/N cycle and for generating a phase difference, for a 1/N cycle, included in picture data output by the N camera modules;
   an output synthesizing apparatus, for synthesizing, in a time division manner, picture data output by the N camera modules; and
   an image processing apparatus, for, based on information concerning distances among the N camera modules, employing the picture data obtained by the N camera modules, and synthesized by the output synthesizing apparatus, to reconstruct a single target picture.

6. The photography system according to claim 5, wherein the output synthesizing apparatus includes:
   a circuit for synthesizing, in a time division manner, picture data output by the N camera modules by employing a selector that uses, as a selection signal, the output of a counter that regards as a counter clock a clock obtained by multiplying by N pixel clocks that are output by the N camera modules, and for outputting the resultant picture data through one camera output terminal.

7. A photography system comprising:
   a camera module, including first and second optical input units, for synthesizing, in a time division manner, picture data respectively obtained by the first and second optical input units, and for outputting the picture data to individual pixels, in synchronization with pixel clocks; and
   an image processing apparatus, for re-synthesizing the two sets of picture data, which have been supplied to the respective optical input units to be synthesized in a time division manner,
   wherein the camera module includes:
   first and second optical device groups, to be operated independently in consonance with the first and second optical input units,
   wherein operating clocks having a phase difference of half a cycle with each other are supplied to the first and the second optical device groups, respectively, to obtain a phase difference of half a cycle between the picture data output by the first and the second optical device groups,
   wherein picture data output by the first and second optical device groups are synthesized in a time division manner for output as the output of a single camera.

* * * * *